Nov. 3, 1931.   W. DUBILIER   1,829,891

ELECTRICAL CONDENSER

Filed Feb. 14, 1924

INVENTOR
William Dubilier
BY
H. R. van Deventer
his ATTORNEY

Patented Nov. 3, 1931

1,829,891

UNITED STATES PATENT OFFICE

WILLIAM DUBILIER, OF NEW YORK, N. Y., ASSIGNOR TO DUBILIER CONDENSER CORPORATION, A CORPORATION OF DELAWARE

ELECTRICAL CONDENSER

Application filed February 14, 1924. Serial No. 692,866.

This invention relates to electrical condensers. In the manufacture of electrical condensers it is desirable to secure intimate contact between the conducting plates and the dielectric and to exclude all air pockets which otherwise cause high electrical losses.

In my United States Patent No. 1,229,915 granted June 12, 1917, I have disclosed the necessity for securing intimate surface contact between the conducting and insulating plates forming the condenser and the necessity for clamping the same under pressure.

The present invention consists of an improved method of so constructing electrical condensers that intimate surface contact is secured between the plates thereof.

Another object of the invention is to provide a condenser in which the plates are not only in intimate surface contact, but in which a condenser so constructed is securely clamped under pressure.

A further object of the invention is to provide a condenser in which the plates thereof are in intimate surface contact and at the same time the conducting plates thereof are provided with flexible terminals of metal foil or the like, whereby the said plates may be connected in various ways.

In the accompanying drawings.

Figure 3:
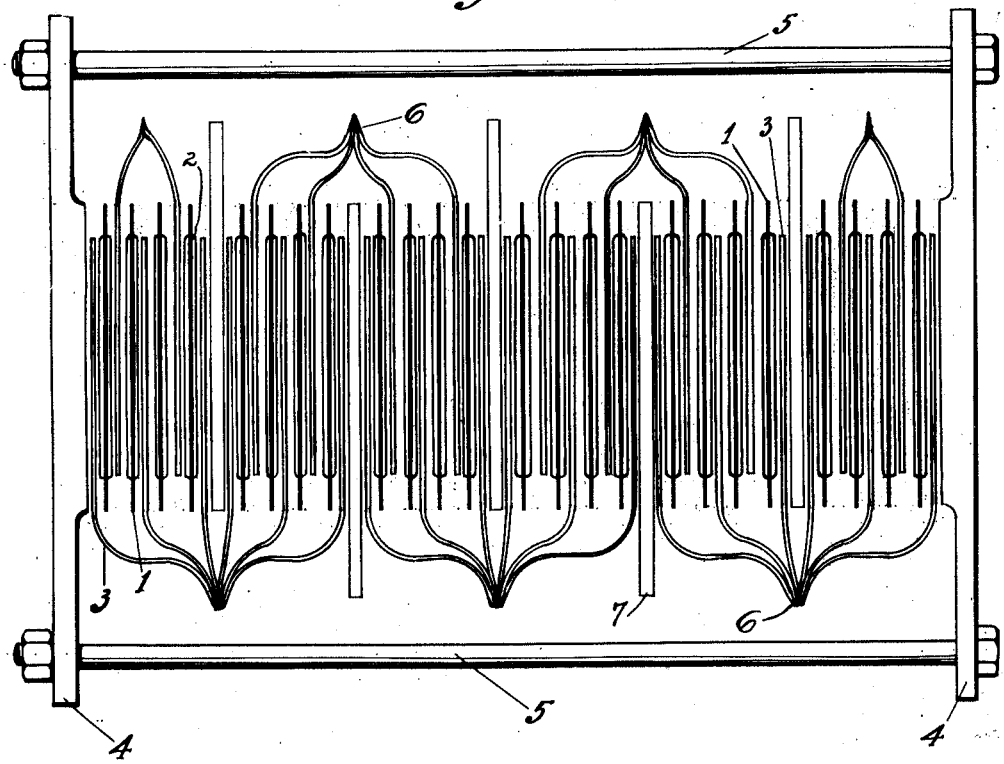
Figure 3 shows a complete condenser constructed in accordance with my invention.

It will be understood that in all of the drawings the thickness of some of the parts is exaggerated for the sake of clearness.

For the sake of illustration, I have shown my invention applied to a condenser suitable for high voltage, high frequency currents, such as used in connection with radio transmitting apparatus. It will be understood, however, that while I have shown one form of condenser, I do not limit myself to the precise construction herein disclosed, but that the invention can be carried out in many different ways coming within the scope of the appended claims.

1 denotes a sheet of separator element of suitable dielectric material such as mica or the like. This may be coated on one or both sides with a conducting coating 2. This coating may be applied in any suitable manner such as by electro-plating or by spraying or painting or by the Schoop process in which the metal is deposited on the mica sheet by blowing a heated metal vapor thereagainst.

It is sufficient for my purpose that the mica sheet have upon it a metal coating in intimate contact therewith, thereby excluding all air pockets or spaces.

Hitherto it has been customary in making a condenser, first to take the mica sheet and place thereupon a piece of tinfoil or the like and then place upon the tinfoil another sheet of mica and so on, until the condenser is built-up, as disclosed in my prior patent before mentioned.

It has also been proposed to coat the mica plates with metal in any suitable manner and then build a condenser out of these coated plates, uniting the edges of the plates by joining the coatings. It should be obvious, however, that it is difficult to so join the plates, and with some dielectric substances the applied metallic coating will rub off easily or crack in the handling of the dielectric, especially in mica, which has cleavages; so that if the sheets are put into a clamp, part of the metallic surfaces are liable to crack off and damage the condenser.

Further, the coatings 2 may not always be put on evenly, but by employing the sheets 3, to be more fully described presently, which would preferably be of soft foil, such as a combination of lead and tin, the objections of unevenness and the like are overcome; or if the coating does crack, it will do no harm in the operation of the condenser.

It further is known in practice that when the coatings 2 are copper electro-plating, or put on by the Schoop process, it makes a brittle element which would not be suitable for clamping. But a foil 3 between the sheets 1, acts as a cushion, and permits clamping to advantage.

My invention thus consists in a combination of the two known methods heretofore used whereby I obtain the advantages of the metal coated plates in which the metal coating is in intimate contact with the mica and also the advantages of the construction wherein the commonly known method of using alternating sheets of mica and foil are employed.

Figure 3 illustrates a complete condenser made in accordance with my invention. Here the mica plates 1, 1 are provided with the metal coatings 2, 2 in intimate contact therewith. Placed between said coatings 2 are the pieces of foil 3, 3. After a suitable number of the sheets of foil and metal coated plates have been assembled, the projecting ends 6, 6 of the metal foil 3 may be connected together in any suitable manner, these ends being free and therefore eliminating the trouble otherwise encountered if only the metal layers 2 are employed. Preferably the condenser is made up of sections separated by insulating plates 7; and the metal coatings of the different sections are shown as connected in series.

After the condenser plates have been assembled they may be mounted between clamps 4, 4 which may be bolted together under high pressure by means of bolts 5, 5, or secured together in any other suitable manner.

Figure 1:
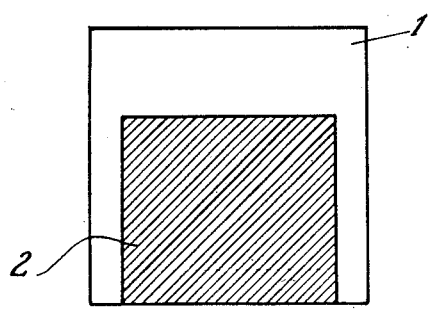
Figure 1 shows in face view one of the insulating sheets of a condenser made in accordance with my invention.
Figure 2:
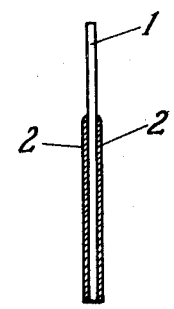
Figure 2 is a sectional view taken vertically through the sheet, Figure 1.

It will be observed that the metal coatings shown on the plate, Figures 1 and 2, may either cover only a portion of the plate or all of the surfaces thereof. If necessary, only the center portion of the plate may be coated as shown in Fig. 3, leaving a free margin of insulating material all around the conducting surface, for with my improved construction, the piece of tinfoil lying upon the conducting surface serves as a terminal therefor. I have not entered into detail as to the arrangement of the sections of the condenser; but each section may comprise a plurality of dielectric and conducting sheets. Also I have not described in detail the insulated plates 7 between the sections arranged to project alternately in opposite directions, beyond the ends thereof, so that the projecting ends of the plates 7 serve as shields between the ends of adjacent sections not connected together, such as the upper ends of the two sections at the right of Figure 3. For details of the construction of such a condenser, I refer to my U. S. Patent No. 1,229,915 hereinbefore mentioned. Figure 3, however, shows the arrangement of the said patent embodying the invention disclosed and claimed in the present application.

Condensers constructed in accordance with my invention may be vacuum impregnated or immersed in oil or otherwise treated in any known manner to increase their insulation characteristics and reduce brush discharge around the edges of the plates. As such condensers are well known and do not come within the scope of the present invention, I do not describe the same.

Having described my invention, what I believe to be new and desire to secure and protect by Letters Patent of the United States is:—

1. An electric condenser having a dielectric, a metal coating in intimate contact therewith and a sheet of soft metal foil pressed into close contact with said coating over substantially the entire surface thereof.

2. An electric condenser comprising dielectric separators having opposite faces, metal coatings in intimate contact with a portion of both faces of said separators, and sheets of soft metal foil between the separators and in contact with said coatings over substantially the entire surface thereof.

3. An electric condenser having a dielectric, a metal coating in intimate contact therewith, and a sheet of soft metal foil pressed into close contact with said coating, said foil having a projecting portion forming a terminal.

4. An electric condenser comprising a plurality of dielectric plates, metal coatings upon said plates in intimate contact therewith, a plurality of soft metal plates between the dielectric foils and in contact with said coatings, and connections between said metal foils, whereby the condenser as a whole may be connected in circuit.

5. An electric condenser having a plurality of dielectric plates, metal coatings in intimate contact with said plates, a plurality of soft metal foils between the dielectric plates and in contact with said coatings and covering a portion of the surface thereof, and means for clamping said dielectric plates with their metal coatings and said metal foils under heavy pressure.

6. An electrical condenser comprising a dielectric, a coating of conductive material deposited on the surface of the dielectric to form an armature of the condenser, and a sheet of soft foil conforming to the surface of said coating in intimate contact therewith and extending over substantially the entire active area of the coating, said foil also comprising a means for connecting the armature in circuit.

In testimony whereof I affix my signature.
WILLIAM DUBILIER.